No. 682,373. Patented Sept. 10, 1901.
W. C. WHITNEY.
COMPUTING SCALE.
(Application filed Nov. 24, 1900.)
(No Model.) 3 Sheets—Sheet 2.
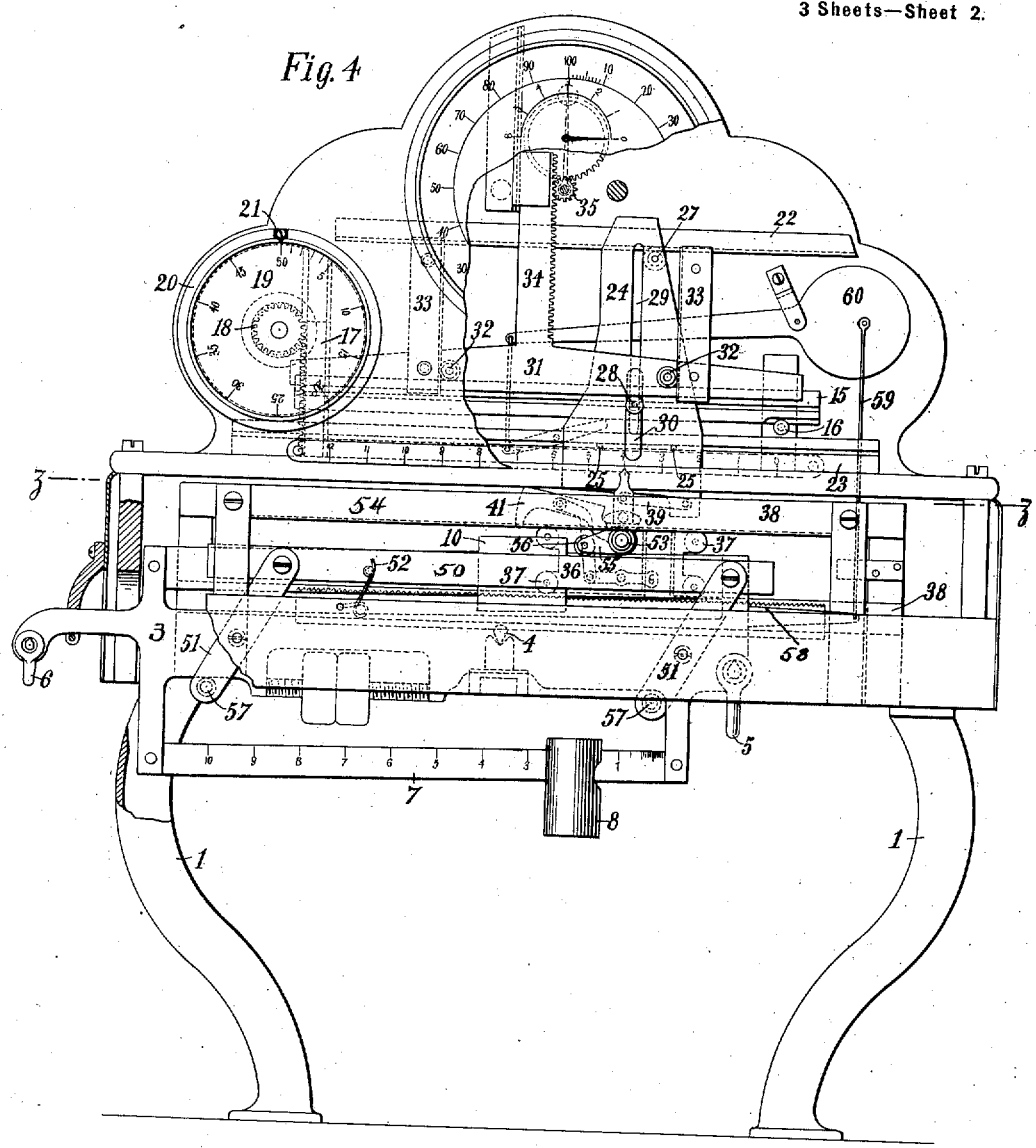
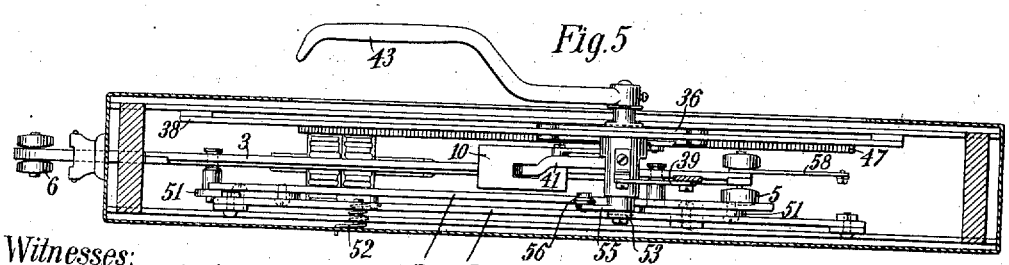
Witnesses: Inventor
Raphaël Netter William C. Whitney,
Benjamin Miller by Kerr, Page & Cooper Attys

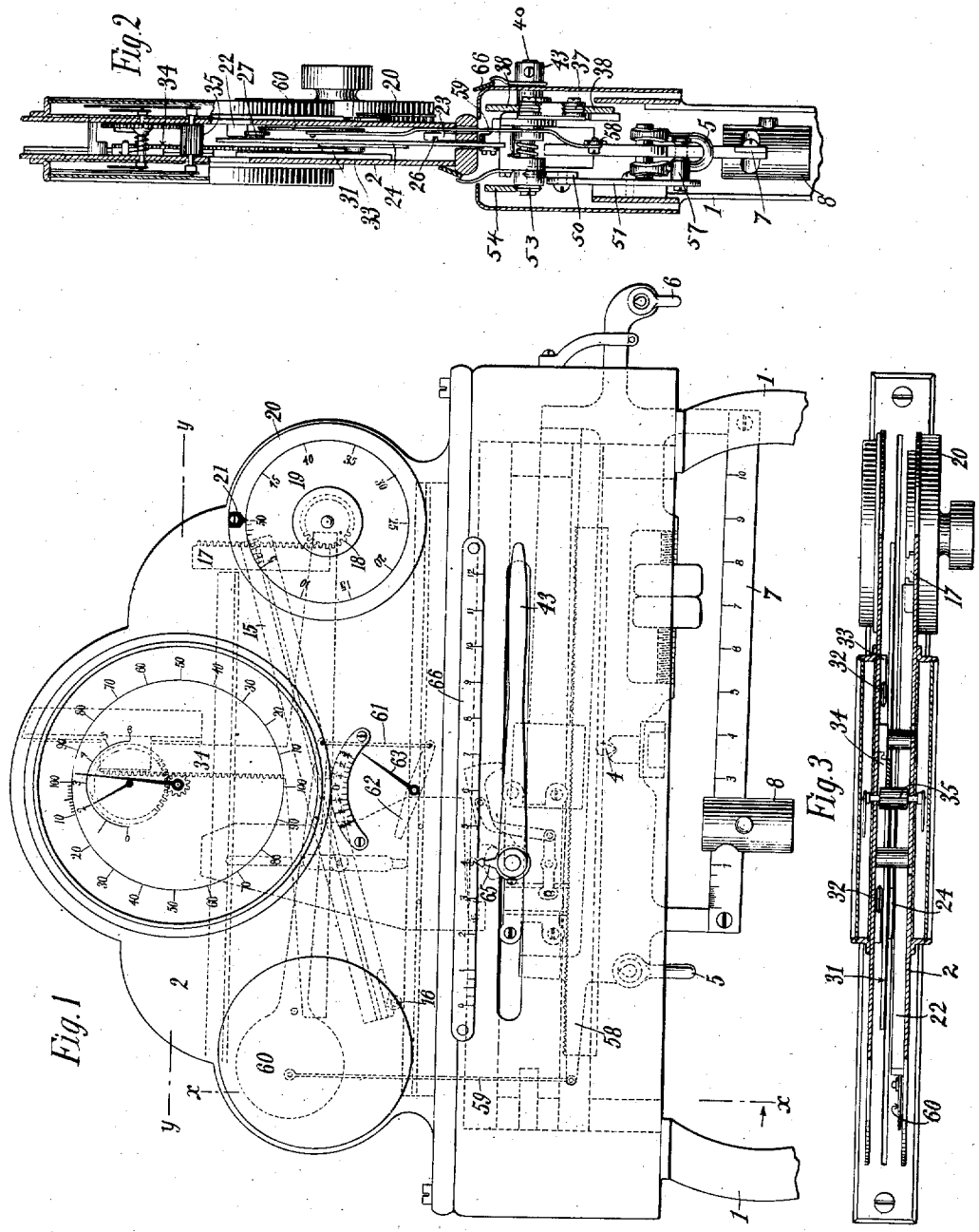

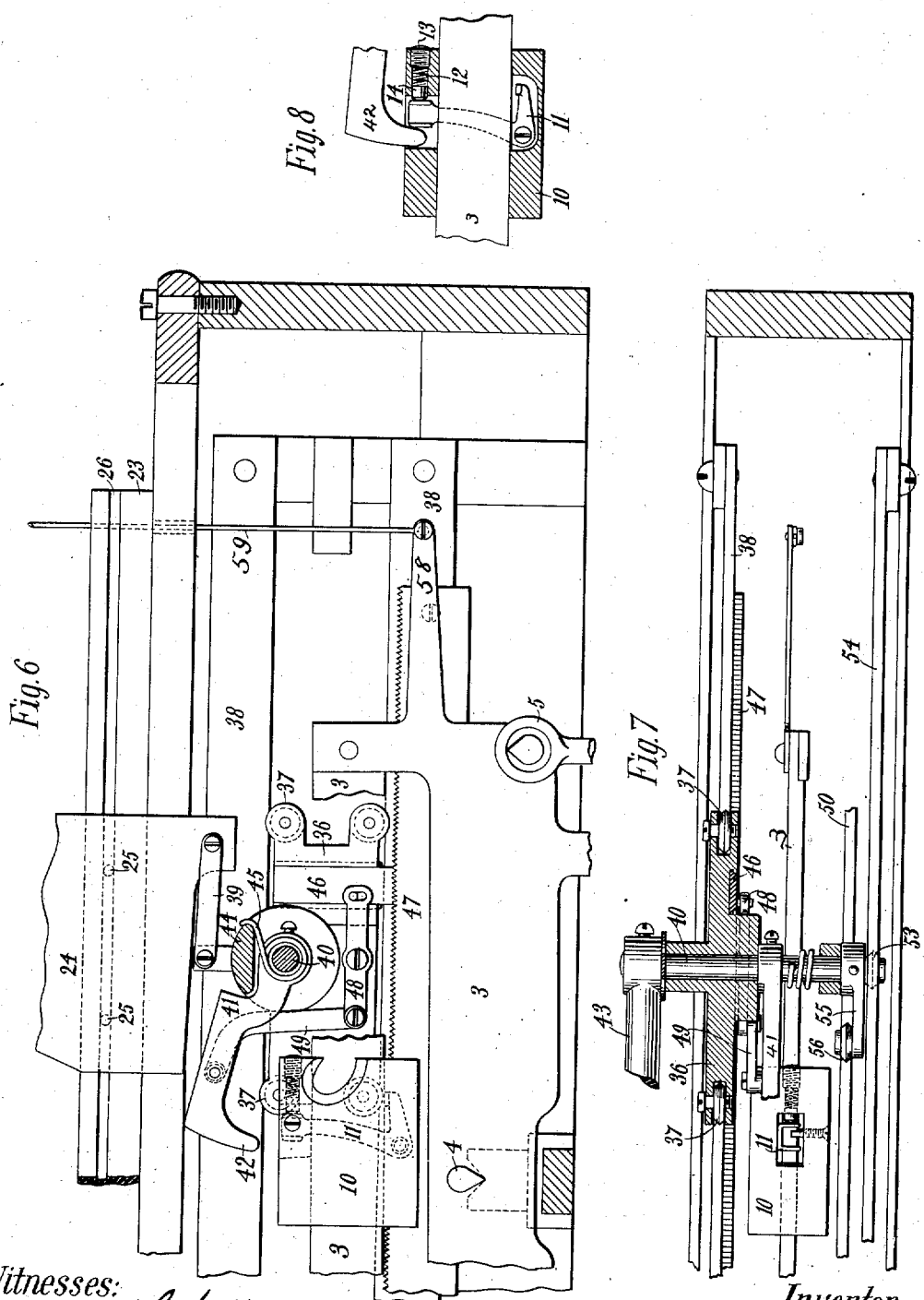

UNITED STATES PATENT OFFICE.

WILLIAM C. WHITNEY, OF NEWARK, NEW JERSEY, ASSIGNOR TO THE WILMORE COMPUTING SCALE COMPANY, OF SAME PLACE.

COMPUTING-SCALE.

SPECIFICATION forming part of Letters Patent No. 682,373, dated September 10, 1901.

Application filed November 24, 1900. Serial No. 37,575. (No model.)

*To all whom it may concern:*

Be it known that I, WILLIAM C. WHITNEY, a citizen of the United States, residing at Newark, in the county of Essex and State of New Jersey, have invented certain new and useful Improvements in Computing-Scales, of which the following is a specification, reference being had to the drawings accompanying and forming a part of the same.
This invention is an improvement in computing-scales of the general class in which the movement of the poise along the beam to indicate the weight of an article operates computing mechanism to an extent proportional to such movement, causing it to indicate the cost of the article weighed according to a given unit price, the object of the invention being to provide a more practicable form of such apparatus and one better adapted to general use.

The improvements in which the invention resides are primarily designed for the purpose of facilitating the manipulation of a scale of which the beam and computing mechanism are inclosed in a casing and for preventing the movement of either the computing mechanism or the poise along the beam under any circumstances without a corresponding movement of the other, although leaving the scale disconnected from the computing mechanism at all times except during the longitudinal movement of the poise.

The invention also comprises certain details of construction, which will be better understood from the drawings and the specific description of the same.

Figure 1 is a front elevation of the main and essential parts of my improved scale with computing attachment. Fig. 2 is a vertical section of the same on line *x x* of Fig. 1. Fig. 3 is a horizontal section on line *y y* of Fig. 1. Fig. 4 is a rear elevation of the apparatus with portions of the casing cut away to expose the interior mechanism. Fig. 5 is a horizontal section on line *z z* of Fig. 4. Fig. 6 is an enlarged view in side elevation of the poise and the devices for connecting the same with the computing mechanism. Fig. 7 is a top view of the same; and Fig. 8 is a sectional view of the poise, showing the locking device within the same.

The working portions of the scale are inclosed in a suitable casing 2, usually of sheet metal and supported on legs 1 1, adapted to be mounted on a counter or any other proper support. The beam may be of any desired construction, preferably an ordinary rectangular frame 3, supported on a knife-edge fulcrum 4 and provided at the end of its short arm with a swinging link or yoke 5, from which the scale-pan is suspended, and at the opposite end with the usual yoke 6 for attachment of additional weights. Below the beam proper is the usual supplemental tare-bar 7, provided with a sliding poise 8. On the upper bar of the frame of the scale-beam 3 is the poise 10. Within this poise in a suitable recess is pivoted a lever 11, the arms of which are at substantially right angles to each other. A spiral spring 12, interposed between and connected to a screw-plug 13 and a head 14, bears against the end of the long arm of the lever 11 and normally forces the other arm into engagement with the under edge of the bar upon which the poise slides. This device serves as a locking device for the poise, and in practice I have found that simple frictional contact between the lever 11 and bar 3 is sufficient for this purpose. The parts thus described constitute a beam-scale which, with the exception of the locking device for the poise, differs in no essential particular from others of its class.

The computing mechanism is arranged in the casing above the scale-beam. With regard to this mechanism I would state that it may be very greatly varied in construction and, in fact, that any form may be employed which will be capable of a suitable movement in proportion and proper relation to the movement of the poise along the beam. The particular form of computing mechanism shown in the present instance consists of what may be termed an "angular" member 15, which is a slotted bar pivoted at 16 and made angularly adjustable about this pivot by means of a rack 17, with which it is in engagement, and a pinion 18, fixed to the shaft of an indicating-disk 19, having suitable graduations along its edge and adapted to be turned by a knob in a circular frame 20, to which is attached a pointer 21. This latter, by its position with reference to the scale on the edge of the disk 19, indicates the unit price for which the angular member is adjusted. Two horizontal bars 22 23 are secured in the casing 2 to form guides for a plate 24, which is provided with pins 25, engaging with a slot 26 in the lower bar 23, and a roller 27, running in a groove in the lower edge of the upper bar 22. The plate 24 has also a vertical slot 29, in which works a slide 30, provided with a pin which engages with the slot in the angular member 15, and a roller 28, which bears against the lower edge of a bar 31. Said bar 31 is guided by rollers 32, bearing against the vertical guide-bars 33, and is provided with an extension or arm 34, constituting a rack-bar that engages with the pinion 35 of a pointer or train of gear-wheels operating one or more pointers which turn over a graduated dial-plate and by their position indicate the price of the article weighed.

Inasmuch as the computing mechanism in itself is not of my invention, but is a device now well known, it is sufficient to say of it that when the plate 24 is moved laterally the slide 30, by reason of its engagement with the angular member 15, is raised more or less, depending upon the angle at which said member is set, and this vertical movement is imparted to the bar 31 and through the latter to the pointer or pointers of the dial-indicators. For convenience I use a dial and pointer on each side of the casing, both for indicating the price and for adjusting the angular member.

Inasmuch as the movement of the price-indicating pointers is proportional both to the position of the angular member 15 and to the extent of lateral movement of the poise there must be such a connection between the plate 24 and the poise that the lateral movements of each will be exactly coextensive and that the positions of the two shall always exactly correspond. In order to effect this, I have devised the following mechanism:

I provide a carriage 36 with wheels or rollers 37, that run on horizontal guide-bars 38, fixed in the frame or casing of the apparatus. This carriage is connected to the plate 24 by a rigid link 39, so that every movement of the carriage is imparted to the plate.

Mounted in suitable bearings in the carriage 36 is a shaft 40, to which is secured an arm 41, having a downwardly-projecting toe 42, with an inclined or wedge-shaped end. A handle 43 is also secured to the end of the shaft 40, that extends out through a horizontal slot in the side of the casing, and by the manipulation of this handle the carriage is moved back and forth along the guide-bars of plates 38 and the shaft 40 turned through a small angle. Movement of the shaft in one direction is limited by the engagement of the arm 41 with a fixed stop 44 on the carriage, and a spring 45, coiled around the shaft, tends to keep the arm 41 in engagement with said stop. By depressing the handle 43 the wedge-shaped toe 42 is forced down into the recess in the poise 10, between the wall of said recess and the end of the lever 11, so that the said lever is slightly turned on its pivot against the force of the spring 14, and thus thrown out of engagement with the scale-beam. By the same operation the carriage and poise are rigidly connected and so remain as long as the handle is depressed, and both are freely movable back and forth. To ascertain the weight of an article in the scale-pan, therefore, and at the same time determine its price, it is only necessary to depress the handle 43 to bring the carriage and poise into engagement and to move both to the point at which the poise when released from the carriage balances the weight in the pan. The pointer will then indicate on the dial the price of the ascertained weight at the unit price for which the angular member was adjusted, while the weight may be read either by examining through a slot the position of the poise on the beam or by the position of an index 65 on the carriage with reference to a scale 66 on the outside of the casing.

In order that the carriage shall not be capable of movement independently of the poise, a plate 46 is fitted to slide vertically in the carriage 36 and is formed with serrations at its lower end, which mesh with similar serrations in the upper edge of a bar or plate 47, fixed to the guide-bar 38. A lever 48 is pivoted to the carriage beneath the shaft 40, one end being connected by a link 49 with the arm 41 and the other to the sliding plate 46 by means of a pin and slot, in order that there may be provision for a certain amount of lost motion between the lever and plate normally, or when the handle 43 is raised the plate 46 is depressed into engagement with the serrated bar 47, which prevents its movement in either direction. When the handle 43 is depressed, however, it first brings the toe 42 into the recess in the poise, and after a positive connection between the carriage and the poise is thus provided for a slight movement raises the plate 46 out of engagement with bar 47 and leaves the carriage free to move.

In order to provide for the more practicable working of the apparatus, a bar 50, parallel to the line of travel of the carriage 36, is mounted by pivotal connection with two levers 51 51 and held in its uppermost position by the action of a spring 52, secured to the frame. The shaft 40 is prolonged beyond the carriage 36 to the opposite side of the casing and carries at its end a roller 53, which runs along the lower edge of a fixed bar 54, which latter affords a bearing that relieves the strain on the carriage when the handle 43 is depressed. To the shaft 40 there is also secured an arm 55, carrying a roller 56, that travels along the upper edge of the bar 50 and serves to depress this bar when the shaft 40 is turned. The lower ends of the levers 51, which support the bar 50, carry studs 57 with rollers thereon which, in the turning movement to which the levers 51 are subjected when the bar 50 is depressed, engage with the lower edge of the scale-beam on opposite sides of its fulcrum and bring it into exact parallelism with the line of travel of the carriage. There will thus be no relative movement of any kind between the carriage and the poise as long as the handle 43 is depressed.

Another feature of novelty in the apparatus is an attachment for indicating exact balance or very small variations in weight. This consists of an extension 58 from the short arm of the scale-beam which by means of a link or rod 59 is connected to the short arm of a balanced lever 60, the long arm of which is connected by a rod 61 with one arm of a small balanced lever 62 on a delicately-pivoted spindle carrying a pointer 63. By thus multiplying the movement of the scale-beam the least departure from a true balance is readily shown.

It will be observed from the above description of my invention that the apparatus, while composed of two wholly-independent devices—a weighing-scale and a computing mechanism—is nevertheless so organized that the functions of one cannot be utilized without the operation of the other. In other words, the manipulation of the element the use of which is necessary to an adjustment of the poise to determine the weight of a given article involves the operation of the computing mechanism, whose readings are proportional to, but in no sense produced by, the weight.

Having now described my invention, what I claim is—

1. In a computing-scale, the combination with a scale-beam and poise, of a computing mechanism, a locking device for rendering the said mechanism normally incapable of being operated by the weighing devices, and means for connecting the computing mechanism and poise and also for controlling the locking device, whereby the computing mechanism is rendered operative when connected with the weighing mechanism, as set forth.

2. In a computing-scale, the combination with a scale-beam and a poise normally locked against movement on the beam, of a computing mechanism normally locked against operative movement by the weighing mechanism, and a device for connecting the poise and computing mechanism and at the same time unlocking both, as set forth.

3. In a computing-scale, the combination with a scale-beam and a poise, of a computing mechanism, a device for connecting and disconnecting the poise and computing mechanism, and a locking device for the computing mechanism connected with and controlled by the connecting device substantially as set forth.

4. In a computing-scale the combination with a scale-beam and a sliding poise thereon, of a computing mechanism having a part adapted to move in a direction parallel with the plane of the beam, a locking device which normally prevents the movement of said part, and an arm thereon adapted to be thrown into engagement with the poise and connected with the said locking device so as to release the computing mechanism when in engagement with the poise, as set forth.

5. In a computing-scale the combination with a scale-beam and a sliding poise thereon, of a computing mechanism having a part capable of movement corresponding to that of the poise, a device for connecting and disconnecting the poise and the said part of the computing mechanism and means operated thereby for holding the beam in a horizontal position while the poise and computing mechanism are connected, as set forth.

6. In a computing-scale the combination with a scale-beam, of a computing mechanism, a poise on the beam, a clutch carried by the poise and adapted to lock it on the beam, and a device for connecting the computing mechanism with the poise adapted by its engagement with the poise to release the clutch thereon, as set forth.

7. In a computing-scale the combination with a scale-beam, a sliding poise and a computing mechanism, of a carriage mounted to travel in a path parallel with the plane of the beam and connected with the computing mechanism, locking devices on the poise and the carriage, a device carried by the carriage adapted to be moved into engagement with the poise, and by its movement to unlock both the carriage and poise, as set forth.

8. In a computing-scale the combination with a scale-beam, a sliding poise and a computing mechanism, of a carriage mounted to travel in a path parallel with the plane of the beam and connected with the computing mechanism, means for connecting and disconnecting the carriage and poise and means controlled thereby for maintaining the beam parallel with the path of the carriage while connected with the poise, as set forth.

9. In a computing-scale of the kind described, the combination with a scale-beam and sliding poise, of the traveling carriage, a stationary track therefor, a locking device on the carriage arranged normally to prevent movement of the carriage, a connecting device on the carriage, adapted to be moved into engagement with the poise and connected with the said locking device, whereby the carriage is released when connected with the poise, as set forth.

10. In a computing-scale of the kind described, the combination with a scale-beam, and sliding poise, of the traveling carriage, a stationary track therefor, a serrated sliding plate on the carriage normally engaging with a serrated portion of the track, a connecting device on the carriage, adapted to be moved into engagement with the poise, and connections between said device and the sliding plate whereby the plate is raised out of engagement with the track when the carriage and poise are connected, as set forth.

11. In a computing-scale of the kind described the combination with the scale-beam and computing mechanism of a sliding poise, a controllable connecting device on the computing mechanism and a pivoted spring-actuated lever on the poise normally bearing against the beam, but adapted to be released by the engagement of the connecting device with the poise, as set forth.

12. In a computing-scale of the kind described the combination with a scale-beam and poise, of a fixed track or guide parallel to the plane of the beam, a carriage thereon connected with the computing mechanism, a rock-shaft on the carriage, an arm thereon for engaging with the poise, a bar having a parallel motion, means connecting the rock-shaft and said bar, whereby the latter is moved with the rock-shaft, and connections between the bar and the scale-beam, whereby the scale-beam will be held parallel with the track of the carriage when the latter is connected with the poise, as set forth.

13. The combination with the beam and poise of a weighing mechanism, of a computing mechanism, a carriage intermediate the computing mechanism and the weighing mechanism, connecting means between the carriage and the computing mechanism, a movable connecting device on the carriage arranged to be brought into engagement with the poise to unite it with the carriage, means for locking the carriage against movement, and a handle arranged to move the said connecting device and cause it to engage the poise while the carriage remains locked, substantially as set forth.

14. The combination with the scale-beam and poise, of the sliding plate 24 of the computing mechanism the carriage 36, permanently connected with plate 24, the arm 41 mounted on the carriage and adapted to be turned to engage with a recess in the poise, and the handle 43, for turning said arm and moving the carriage and poise, as set forth.

WM. C. WHITNEY.

Witnesses:
HENRY F. GIERE,
WILLIAM H. SANDERSON.